United States Patent [19]

Erickson et al.

[11] 4,184,861
[45] Jan. 22, 1980

[54] ENERGY EFFICIENT APPARATUS AND PROCESS FOR MANUFACTURE OF GLASS

[75] Inventors: Thomas D. Erickson, Newark; Charles M. Hohman, Granville, both of Ohio

[73] Assignee: Owens-Corning Fiberglas Corporation, Toledo, Ohio

[21] Appl. No.: 924,274

[22] Filed: Jul. 13, 1978

[51] Int. Cl.$^2$ ............................................. C03B 3/00
[52] U.S. Cl. ....................................... 65/27; 65/134; 65/335
[58] Field of Search ......................... 65/27, 134, 335

[56] References Cited

U.S. PATENT DOCUMENTS

| | | | |
|---|---|---|---|
| 3,169,015 | 2/1965 | Henry | 65/134 UX |
| 3,607,190 | 9/1971 | Penberthy | 65/134 |
| 3,788,832 | 1/1974 | Nesbitt et al. | 65/134 |
| 3,880,639 | 4/1975 | Grubb et al. | 65/134 |
| 3,884,292 | 5/1975 | Pessolano et al. | 165/39 |
| 3,953,190 | 4/1976 | Lange | 65/335 |
| 4,045,197 | 8/1977 | Tsai et al. | 65/134 X |
| 4,062,667 | 12/1977 | Hatanaka et al. | 65/135 |
| 4,074,989 | 2/1978 | Brzozowski et al. | 65/27 |
| 4,074,990 | 2/1978 | Brzozowski et al. | 65/134 X |
| 4,074,991 | 2/1978 | Brzozowski et al. | 65/27 |

FOREIGN PATENT DOCUMENTS

848251 1/1977 Belgium .
7603720 2/1976 France .

OTHER PUBLICATIONS

"Cooling with Heat Pipes", Machine Design, Aug. 6, 1970, pp. 86–91, by Francis J. Lavoie.

*Primary Examiner*—Arthur D. Kellogg
*Attorney, Agent, or Firm*—Ronald C. Hudgens; Charles F. Schroeder; Robert F. Rywalski

[57] ABSTRACT

Disclosed is a method for manufacturing glass, and apparatus for effecting same, which comprises passing flue gases from a glass melting furnace through a bed of agglomerates of glass forming batch materials so as to heat the agglomerates to a temperature less than that at which they form an aggregated mass, cooling the flue gases as they pass through the bed with a heat exchanger positioned in the bed, and then melting the heated batch materials in a fossil fuel fired melter to form molten glass. The heat transfer medium of the heat exchanger may then be transported to a different location and the increased energy therein employed for a beneficial purpose.

14 Claims, 3 Drawing Figures

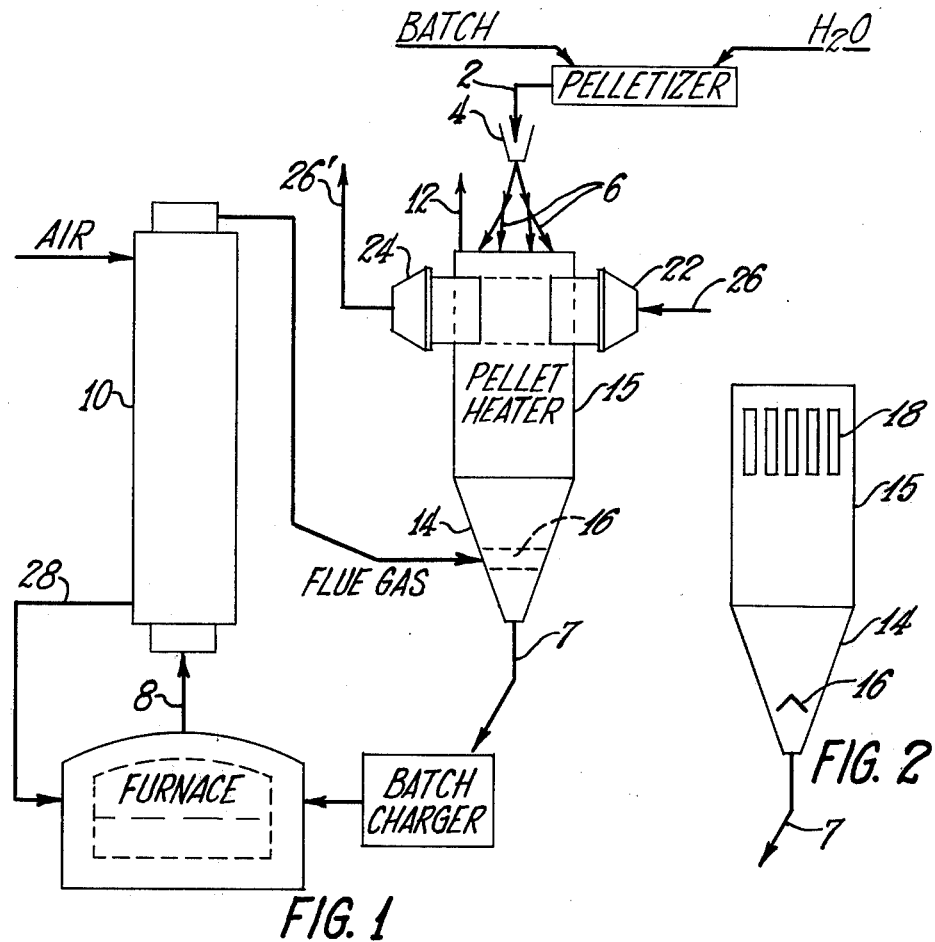
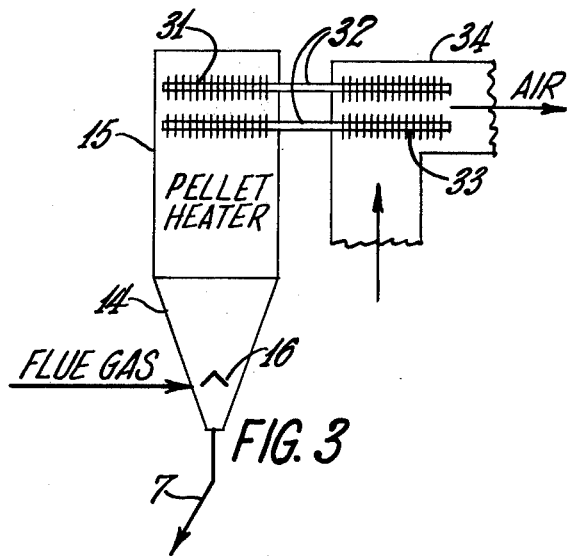
FIG. 1
FIG. 2
FIG. 3

ENERGY EFFICIENT APPARATUS AND PROCESS FOR MANUFACTURE OF GLASS

THE INVENTION

The present invention relates to the art of glass manufacturing. More particularly, this invention relates to an improved process which minimizes the amount of energy which is wasted by discharge to the atmosphere.

Methods are known in the art for glass manufacturing wherein glass-forming, batch ingredients are converted into agglomerates and these agglomerates then heated in a chamber by a direct contact with flue gases from a glass melting furnace so as to produce free-flowing, non-aggregated, agglomerates which are then conveyed and discharged to the glass melting furnace. These agglomerates are composite, integral, self-supporting masses consisting essentially of all the substantial batch materials and may take the form of balls, extrusions, discs, briquettes, and pellets. Such a process is exemplified by copending application Ser. No. 849,839, filed Nov. 9, 1977 now U.S. Pat. No. 4,124,366 and its parent applications. That application discloses a process for making glass wherein free water-containing pellets are discharged to a vertical bed contained within a chamber and furnace flue gases pass, in direct contact with and countercurrently to, downwardly moving pellets of the bed to dry and preheat them. The flue gases enter the pellet bed on the order of about 1500° F. and the process is operated so as to prevent water in the gases from condensing in the chamber. In this manner volatile pollutants in the flue gases are extracted and recycled to the melter via the pellets. Further exemplification of the above can be seen in U.S. Pat. No. 3,880,639.

In instances of practicing the above copending application, it has been observed that the flue gases leave the chamber, in which heating of the pellets is done, at a temperature which is relatively high. These flue gases leaving the heating chamber hence contain a significant amount of energy which would otherwise be wasted. Additionally another detriment of this is that the exiting temperature can be such as to preclude the maximization of pollutant recovery. That is, if the temperature is too high a phase transformation of gaseous polluting effluents in the flue gases, and their recovery, will not be suitably affected. In order to resolve the latter situation, ambient air has been introduced into the chamber, as direct flue gas dilution air, for purposes of decreasing the temperature of the flue gases as they pass through the bed and exit from the heating chamber. Typically, the amount of dilution air employed has been such that the directly diluted flue gas temperature exiting from the chamber is on the order of about 250° F. This approach obviously does not deal with the matter of wasted energy and, furthermore, creates other undesirable problems. That is, by introducing dilution air into the chamber the velocity of the gases flowing through the chamber, because of their direct mixing, is increased which, in turn, can create a dusting problem by which solid particles are carried out of the chamber in the exiting gas stream. This dusting obviously is detrimental from an environmental point of view and to resolve this problem, requires larger capital expenditures to effect the removal of such dusted particulates from the exiting flue gas stream.

U.S. Pat. No. 3,788,832 is also directed to a method in which agglomerated glass batch is preheated by combustion gases. This patent teaches that the temperature of the gases is a major factor in the removal of particulate sodium sulfate. In accordance with the teachings of that patent, dilution air is introduced into the system to change combustion gas temperature. Thus, this patent is subject to the same deficiencies indicated above.

From the foregoing it will be seen that there is a need in the art to provide for a more energy efficient process of glass manufacturing which process will likewise not increase environmental pollution. In accordance with this invention, applicants now satisfy this need in the art.

In contrast to the direct extraction of heat from the flue gases as they pass through the furnace by the use of dilution air, as generally described above, applicants provide an improvement in such processes by indirectly extracting heat from the flue gases in the chamber during the heating of the agglomerated glass batch. In this way, dusting is not increased, the amount of unused energy emitted to the atmosphere in the flue gases is significantly minimized and the heat transfer medium employed in the indirect extraction of heat is in a condition conducive to the recovery of energy, or heat, therefrom. That is, because this heat transfer medium is heated, and the flue gases cooled, through an indirect heat exchange process, that medium does not contain any undesirable pollutants, or contaminants, and is ideally suited for the beneficial recovery and utilization of its energy. Exemplary of the beneficial purposes for which such indirectly extracted heat may be employed are: the use of such heat in heating curing ovens as, for example, ovens for the curing of binders, and the like, commonly used in the manufacture of fibrous glass products; the use of such heat to provide heated makeup air for supply to combustion burners; or even the use of such heat for purposes of maintaining the temperature comfort of employees as, for example, in the heating of plants and offices. In practice the amount of heat extracted will be insufficient to condense water vapor carried in the flue gases but will be sufficient to cause a phase transformation of gaseous polluting effluents carried in the flue gas. Best results will be obtained by maintaining the temperature of the flue gases passing through a portion of the bed at as low a temperature as possible so long as the dew point temperature of the water vapor in the gases is not attained. Outstanding results will be realized when the indirect heat extraction is effected by air flowing through a hollow duct member and, preferably, a plurality of duct members. Another highly desirable method of effecting the indirect heat extraction is to employ a heat-pipe heat exchanger or, more generally to accomplish this by vaporizing a liquid heat transfer medium. Beneficial heat can then be extracted from the vaporized heat transfer medium by efficient heat transfer in which the medium is then in turn condensed, hence liberating its heat of condensation. Preferably, the foregoing will be practiced wherein the agglomerates are in the form of pellets, for example, pellets of a size generally between about ¼" to about ¾" and preferably between about ⅜"-⅝", with the pellets being formed on a rotary disc pelletizer with a suitable pelletizing liquid. Preferably the liquid will be water.

In accordance with another feature of this invention, there is provided an improvement in known glass making apparatus of the type which comprises means for converting glass-forming ingredients into agglomerates, a combustion heated glass melting furnace, chamber means for preheating said agglomerates by direct contact with the combustion gases from the furnace, means for transporting agglomerates from said agglomerate converting means to said chamber means, means conveying combustion gases from said furnace to said chamber means, and means for conveying preheated agglomerates from said chamber to said furnace. The improvement comprises heat exchange means disposed in said chamber for indirectly extracting heat from the combustion gases.

In accordance with another feature of this invention there is provided a glass melting method comprising discharging free water-containing pellets of glass batch to a chamber having a generally downwardly flowing packed bed of pellets, heating the pellets in the chamber by countercurrent-flow, direct, heat exchange contact with flue gases from a glass melting furnace so as to produce dried, free-flowing, hot pellets, and decreasing the temperature of said countercurrent-flow, flue gases with a heat exchanger positioned in the chamber in the flow path of said pellets and said flue gases, then melting the dried, hot pellets. Desirably, the heat transfer medium of the heat exchanger will then be directed to an energy utilizing location and the energy in said heat transfer medium will then be employed at that location.

While those skilled in the art have extensively worked in this general area, as evidenced not only by the above prior art but also prior art to be hereinafter discussed, none of this prior art has any teachings, or recognition, of the present invention.

U.S. Pat. No. 4,045,197 discloses a process for using waste heat in the exhaust of a combustion heated glass melting furnace to indirectly heat particulate batch materials prior to melting. In accordance with that patent heat pipes are employed with the heat transfer medium of the heat pipe being heated by the waste heat in the flue gases and then, in turn, that heat transfer medium indirectly heats the batch materials. U.S. Pat. No. 3,953,190 discloses flue gases passing through a bed of pellets so as to strip condensate from the flue gas and heat the pellets. The patent is primarily directed to the construction of the pellet heater. U.S. Pat. No. 3,607,190 discloses the direct preheating of particulate batch with furnace effluent gases and combustion gases in a rotary, inclined kiln and then uses those gases in indirect heat exchange relation with a batch bed in a supply hopper for the preheater. The preheater (kiln) is operated to prevent water from condensing. Netherlands patent application No. 77-01390 (priority based upon French application No. 76-03720) discloses, in FIG. 4, a glass melting process in which batch materials are compacted, passed to a drier and in turn passed to a preheating column; flue gases from a furnace are directed to the preheating column, withdrawn therefrom, passed through a cyclone and a blower, and then to the drier. Prior to drier entry, the flue gases may be diluted with a gaseous stream which has been indirectly heated by the flue gases. Belgium Pat. No. 848,251 discloses the use of flue gases from a furnace to heat particulate glass batch in a fluidized bed. The patent teaches discharging some of the flue gases to avoid overheating and also indicates the introduction of air to bring about the necessary temperature. U.S. Pat. No. 4,062,667 discloses a technique for the utilization of the heat in furnace flue gases. These furnace flue gases may be employed to heat glass batch and the glass batch in turn may be employed to preheat the makeup air for combustion. U.S. Pat. Nos. 4,074,989, 4,074,990, and 4,074,991 further exemplify the art with regard to the preheating of glass pellets. As indicated however, none of this prior art has any recognition of the present invention.

The foregoing and other advantageous features of this invention will be more apparent by reference to the drawings wherein:

FIG. 1 generally illustrates a preferred embodiment of this invention;

FIG. 2 somewhat schematically illustrates a preferred form of a heat exchanger; and FIG. 3 illustrates another embodiment of this invention.

Referring now to FIGS. 1 and 2, it will be seen that glass forming, batch materials, and water, are converted into individual agglomerates, preferably pellets, on a rotating disc pelletizer. The free water content of the pellets may be about 10–20% by weight and, while not shown, the pellets preferably are subjected to a screening operation to select pellets of a nominal size of about $\frac{3}{8}''$ to $\frac{5}{8}''$ in diameter. These pellets are then transported by suitable means 2, such as a belt conveyor, to a feed hopper 4 and then in turn the pellets, through a spider-like feeding arrangement 6 are fed to a pellet heater which maintains a bed of pellets (not shown) therein. Pellets generally move downwardly in the bed of the pellet heater and are discharged therefrom as hot, individual pellets and supplied by a duct member 7 to a batch charger which conveys them to a fossil fuel fired glass melting furnace. The combustion gases, or flue gases, from the melting furnace are conveyed by suitable means 8, for example a duct, to a recuperator 10 where they are indirectly cooled with air, for example, from a temperature of about 2600° F. to a temperature on the order of about 1400° F.–1500° F. The heated air 28 is then supplied to the furnace as combustion make-up air. The cooled flue gases are then conveyed by suitable duct means to the pellet heater where they flow in direct contact with the pellets, in countercurrent flow fashion, to dry the pellets and preheat them. The flue gases leave the pellet heater by a suitable outlet, generally designated 12. Preferably the flue gases will be supplied to the pellet heater by a manifold type arrangement with entrances into the heater being on diametrically opposed sides of a lower frustoconical portion 14. In accordance with sound engineering practices, the gases will be distributed generally uniformly across the heater as by employing an inverted V-shaped member 16 (best seen in FIG. 2), which spans frustoconical portion 14.

The heat exchanger contemplated herein is positioned in the pellet bed of the cylindrical portion 15 of the pellet heater. As generally illustrated in FIG. 1, the heat exchanger comprises an inlet manifold 22 to which is supplied a suitable heat transfer medium via a duct 26, and disposed on the opposite side, externally of the pellet heater, is an outlet manifold 24 from which the heated heat transfer medium is removed via a duct 26'. This duct can convey the heat transfer medium to any location for the beneficial use of its energy. In sealed, fluid communication with manifolds 22 and 24, in accordance with a preferred embodiment of this invention, is the heat exchanger in the form of a plurality of hollow, generally rectilinear duct members 18 which are located in the pellet bed. Desirably the system will be operated such that the upper most level of pellets in the heater will be disposed upwardly of duct 18 and, generally, ducts 18 will be located in the upper half of the pellet bed.

The above arrangement is ideally suited for manufacturing a wide variety of glasses but is especially well adapted for the manufacture of fiberizable textile glasses. Typically these glasses are low alkali metal oxide containing glasses, for example, glasses containing, if at all, less than 3% by weight of alkali metal oxides and, more typically, less than 1% by weight. Exemplary of such glasses are the alkaline earth-aluminosilicates where, for example, the cumulative amount of the alkaline earth oxides, plus alumina, plus silica is in excess of about 80% by weight and quite commonly between in excess of about 90% up to, in some instances, virtually 100% by weight.

Another exemplary textile glass is that commonly referred to in the art as an E-glass which may be categorized as an alkaline earth, boroaluminosilicate glass. The latter type glasses typically will comprise at least about 85% by weight, and more commonly on the order of 93–95% by weight, of silica plus alumina plus alkaline earth metal oxides plus boric oxide. Other adjuvants which are typically present in such glasses include fluorine, iron oxide, titanium dioxide and strontium oxide.

As a general proposition, the process represented above will be practiced with two general objectives in mind. First of all it is desired that the pellets exiting from the pellet heater be at as high a temperature as possible without forming an aggregated mass. Obviously, therefore, the temperature of these pellets will be less than their sintering temperature. Additionally, the amount of heat which is extracted from the flue gases as they pass through the bed, past ducts 18, will be such that the cooling effect on the flue gases will be a maximum but will not drop their temperature below the dew point of the water vapor carried in the flue gases. Otherwise, water would condense and severely impair the operation. Suitably the temperature of the flue gases as they exit from the pellet heater will be less than about 275° F. and more desirably less than about 250° F., for example between about 225° F. to about 250° F. Suitably, the temperature of the hot, free-flowing pellets leaving the pellet heater will be in excess of about 300° C. or 400° C. but most desirably will be in excess of about 500° C. or even 600° C.

Further exemplifying the present invention, a standard E glass batch was formulated using approximately 23 to 24% by weight limestone, about 14 to 15% by weight of calcined colemanite, about 30 to 31% by weight of clay, about 29 to 30% by weight of flint, about 1.5 to 2% by weight of sodium silicofluoride and about 0.2% by weight of gypsum. The particle size of the batch ingredients was the same as that employed in manufacturing such glass by conventional melting of particulate batch. The batch was first appropriately mixed and then formed into water-containing agglomerates on a disc pelletizer. The amount of water employed was sufficient to provide pellets generally containing between about 15–17% by weight of free water. An ideal technique for pelletization is disclosed in co-pending application Ser. No. 809,595, filed June 24, 1977. The pellets from the pelletizer were then sent through a conventional sizing apparatus to select pellets having a size generally in the range of about $\frac{3}{8}''$ to $\frac{5}{8}''$ in diameter which were then fed to the pellet heater. Flue gases from a recuperator, at a temperature of about 1400° F., were then passed in a countercurrent manner through the bed of pellets and exited the pellet preheater at a temperature of about 250° F. Ambient air at a temperature of about 80° F. was the heat transfer medium employed and exited from the heat exchanger at a temperature of about 175° F. Dry, hot, free flowing pellets were released from the pellet heater at a temperature of about 1200° F. (649° C.).

Calcined colemanite, i.e. colemanite that has been heated above its decrepitation temperature, is a preferred batch ingredient for supplying $B_2O_3$ to borosilicate glasses. If other minerals are employed which contain colemanite as an impurity, or perhaps some other material which is noted for its decrepitation characteristics, it obviously is preferred to heat such material above its decrepitation temperature prior to employing it. Other materials can, of course, be employed, but as a general matter it will be found that the temperature to which the pellets may be heated will be much less than that obtainable by using calcined colemanite. Mixtures of various $B_2O_3$ sources obviously may be employed. Anhydrous borax and/or 5 mole borax as sole sources of $B_2O_3$ are not preferred because the final pellet temperature must be maintained at an unsuitably low level.

FIG. 3 in a simplified fashion illustrates another embodiment of this invention employing finned heat pipes. Heat pipes per se are well known and are exemplified in the article entitled "Cooling With Heat Pipes" appearing in *Machine Design* Aug. 6, 1970 at page 86. Additionally, the use of heat pipes to extract heat from hot flue gases and to transmit that heat to air is exemplified in U.S. Pat. No. 3,884,292. Thus referring now to FIG. 3, it will be seen that one end 31 of a series of finned heat pipes 32 is disposed in the cylindrical portion 15 of the pellet heater and located as previously indicated. Opposite end 33 is disposed in a duct 34 isolated from the pellet heater in which another suitable heat transfer medium, such as air, may be employed. Thus as will be appreciated the flue gases liberate some of their heat to vaporize the heat transfer medium of heat pipes 32 and this vaporized heat transfer medium then in turn liberates that heat in condensing and hence heats the air flowing in duct 34. Such heated air, may be employed for numerous beneficial purposes as, for example, the heating of curing ovens or to increase the temperature comfort of employees in a plant or office.

While the above sets forth the present invention, it will, of course, be apparent that modifications are possible which pursuant to the patent statutes and laws, do not depart from the spirit and scope thereof.

We claim:

1. In a glass manufacturing method comprising: converting glass-forming batch ingredients into agglomerates, heating a bed of said agglomerates in a chamber by direct contact with flue gases so as to produce non-aggregated agglomerates, said flue gases originating in a glass melting furnace and having been cooled in a heat exchanger prior to said direct contact heating, and discharging said heated agglomertes to a glass melting furnace; the improvement comprising indirectly extracting heat from said flue gases during said heating in said chamber.

2. The improvement of claim 1 and further including the step of employing said indirectly extracted heat for a beneficial purpose.

3. The improvement of claim 1 wherein the amount of heat extracted is insufficient to condense water vapor carried in said flue gas.

4. The improvement of claim 3 wherein said heat is extracted with a heat pipe heat exchanger.

5. The improvement of claim 3 wherein said indirect heat extraction is accomplished by vaporizing a liquid heat transfer medium.

6. The improvement of claim 5 and further including beneficially extracting heat from said vaporized heat transfer medium by condensing said medium.

7. The improvement of claim 1 wherein said heat extraction is effected by air flowing from one side of said chamber to an opposite side through a duct member positioned in said chamber.

8. The method of any one of claims 1–7 wherein said agglomerates are pellets.

9. In a glassmaking apparatus comprising: means for converting glass-forming ingredients into agglomerates, a combustion-heated glass melting furnace, means for cooling combustion gases, chamber means for preheating a bed of said agglomerates by direct contact with the combustion gases of said furnace, means for transporting agglomerates from said converting means to said chamber means, means conveying combustion gases from said furnace to said combustion gas cooling means then to said chamber means, and means for conveying preheated agglomerates from said chamber to said furnace; the improvement comprising heat exchange means disposed in said chamber for indirectly extracting heat from said combustion gases.

10. The improvement of claim 9 wherein said heat exchange means comprises a heat pipe.

11. The improvement of claim 9 wherein said heat exchange means comprises an inlet manifold, an outlet manifold disposed on a chamber side opposite said inlet manifold and a plurality of duct members having a heat transfer medium therein, said duct members being in fluid communication with said manifolds.

12. A glass melting method comprising: discharging free water-containing pellets of glass batch to a chamber having a generally downwardly flowing packed bed of pellets, heating said pellets in said chamber by countercurrent-flow, direct, heat-exchange contact with flue gases from a recuperator of a glass melting furnace so as to produce dried, free-flowing, hot pellets, and decreasing the temperature of said flue gases as they flow through said bed with a heat exchanger positioned in said chamber in the flow path of said pellets and said flue gases, melting said dried, hot pellets.

13. A method of manufacturing glass comprising passing flue gases from a glass melting furnace through a bed of glass-forming material so as to heat said materials to a temperature less than that at which they form an aggregated mass, cooling said flue gases as they pass through said bed by passing air from one side of the bed to an opposite side of the bed through a heat exchanger positioned in the bed, and melting said materials in said furnace to form molten glass.

14. The method of claim 13 wherein said glass is a textile glass.

* * * * *

UNITED STATES PATENT AND TRADEMARK OFFICE
CERTIFICATE OF CORRECTION

PATENT NO. : 4,184,861
DATED : January 22, 1980
INVENTOR(S) : Thomas D. Erickson and Charles M. Hohman It is certified that error appears in the above–identified patent and that said Letters Patent are hereby corrected as shown below:

In Column 6, line 57 delete "agglomertes" and insert therefor "agglomerates".

Signed and Sealed this

Tenth Day of June 1980

[SEAL]

Attest:

Attesting Officer

SIDNEY A. DIAMOND
Commissioner of Patents and Trademarks